June 5, 1934.  F. R. HALL  1,961,352
REAR CURTAIN LIGHT FRAME
Filed April 15, 1931
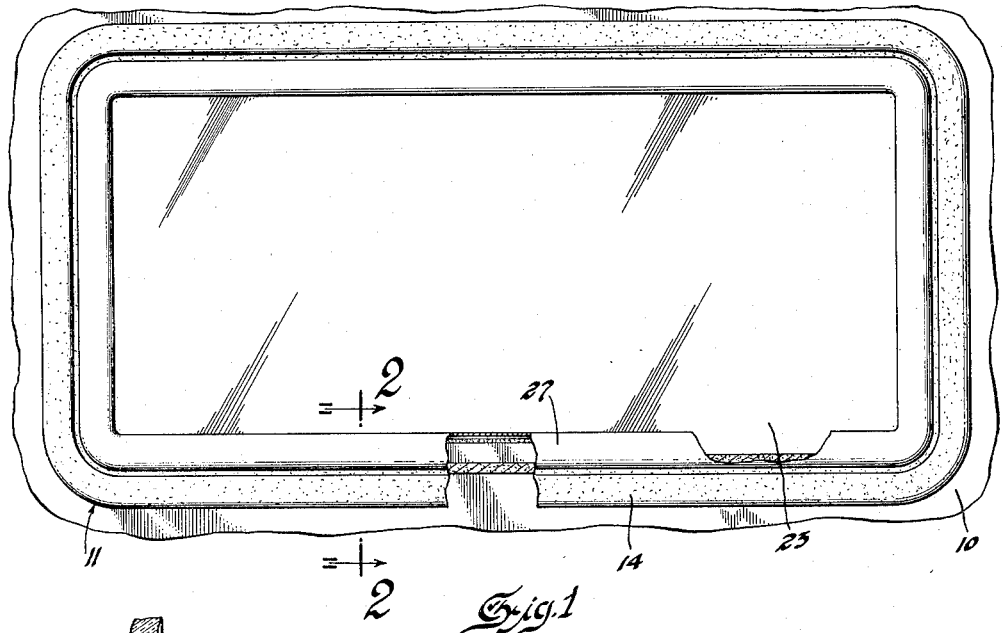
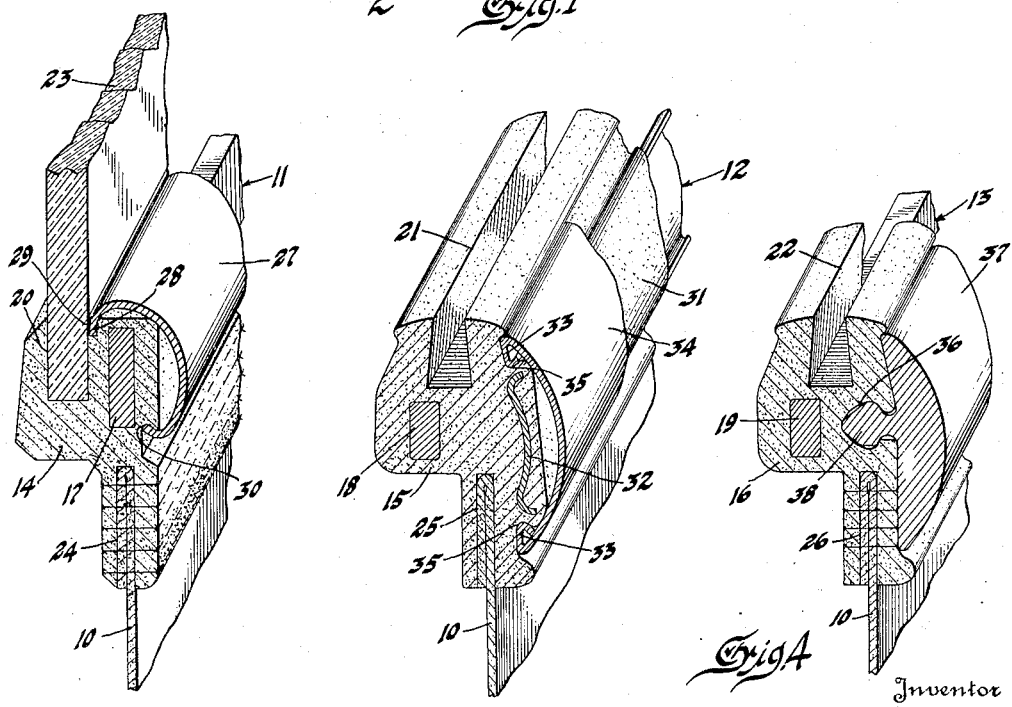
Fig.1
Fig.2
Fig.3
Fig.4
Inventor
Farrington R. Hall
By Blackmore, Spencer & Fluit
Attorneys Patented June 5, 1934

1,961,352

UNITED STATES PATENT OFFICE 1,961,352

REAR CURTAIN LIGHT FRAME

Farrington R. Hall, Detroit, Mich., assignor to General Motors Corporation, Detroit, Mich., a corporation of Delaware Application April 15, 1931, Serial No. 530,203

2 Claims. (Cl. 296—145)

This invention relates to window light frames, and, particularly, to window light frames of the type which are found in the rear curtains of automotive vehicles of the open types.

The window light frames which are found in the rear curtains of automotive vehicles of the open types are commonly made of soft vulcanized rubber moulded around a metal reinforcing member. Mechanically, such frames are satisfactory, but they are not pleasing to the eye and, in fact, detract from the general appearance of the vehicle in which they are installed.

Broadly speaking, it is the object of this invention to provide a window light frame of the type described which will be pleasing to the eye and enhance, rather than detract from, the general appearance of the vehicle on which it is installed. This object is, in the preferred embodiments of my invention which are illustrated in the accompanying drawing, attained by providing an ornamental moulding on the portion of the frame which is visible from the outside of the vehicle.

It is another object of this invention to provide a window light frame and an ornamental moulding therefor so constructed and arranged that the moulding may be applied and attached to the frame after the latter has been completed and, if desired, installed in a curtain or other support so that there will be no chance of the moulding being marred during the operations of making the frame, assembling the window light therewith and/or installing the frame in the curtain or other support.

For a better understanding of the nature and objects of the present invention, reference is made to the following specification in which are described the preferred embodiments of my invention which are illustrated in the accompanying drawing, in which:

Figure 1 is a fragmentary view of the rear curtain of an automotive vehicle of the open type in which is installed a curtain light which is carried by a frame which is constructed in accordance with my invention.

Figure 2 is an enlarged perspective view of a fragmentary section taken on the line 2—2 of Figure 1.

Figure 3 is a view, similar to that shown in Figure 2, of a second embodiment of my invention.

Figure 4 is a view, similar to those shown in Figures 2 and 3, of a third embodiment of my invention.

In the drawing, the reference character 10 indicates the rear curtain of an automotive vehicle of the open type which may be made of fabric, imitation leather or any other suitable material. The reference character 11 (12, 13) indicates a curtain light frame which consists of an endless length 14 (15, 16) of soft vulcanized rubber of suitable contour which is moulded around a stiffening and reinforcing member 17 (18, 19) which is preferably made of metal. In the inner edge of the part 14 (15, 16), there is formed a continuous groove 20 (21, 22) in which the edges of a transparency 23 are adapted to be seated. In the outer edge of the part 14 (15, 16), there is formed a second continuous groove 24 (25, 26) into which the edges which surround the curtain light receiving opening in the curtain 10 are adapted to extend. To the lips of the part 14 (15, 16) which define the groove 24 (25, 26), the curtain 10 is adapted to be secured by any suitable means, such as stitching, as indicated in the drawing.

In Figures 1 and 2, the reference character 27 indicates an ornamental moulding which may be made of metal or any other suitable material which is relatively stiff and inflexible as compared with the material of which the part 14 is made. The moulding is of substantially the same contour as the frame 11 and in cross section is of substantially the shape of an elliptical shell from which a portion has been removed so as to leave two continuous, longitudinally extending, inwardly projecting lips 28. In the outer edge of the groove 20, there is provided a rabbet 29 in which the inner lip 28 is adapted to be seated and on the outer face of the part 14, there is provided an undercut groove 30 in which the outer lip 28 is adapted to be seated. The moulding 27 is adapted to be assembled with the frame 11 by properly superposing the moulding on the frame and pressing the two parts together so that the lips 28 will distort the portions of the part 14 which overhang the grooves 29 and 30 to such an extent that the lips 28 will be enabled to slip into the grooves. When the lips 28 are seated in the grooves 29 and 30, the resiliency of the material of which the part 14 is made will cause the portions thereof which overhang the grooves to assume their original positions and thus, effectively, interlock the frame 11 and the moulding 27, as shown in the drawing. It will be noted that the reinforcing member 17 is so located as to limit transverse flexing of the portion of the part 14 between the grooves 29 and 30 and, consequently, provides additional insurance against accidental separation of the moulding and the frame.

The modified embodiment of the invention which is illustrated in Figure 3 of the drawing does not differ essentially from the embodiment of the invention which is illustrated in Figures 1 and 2 except in that there is provided on the outer face of the part 15 a dovetail rib 31 in which is embedded a generally trough-shaped metal reinforcing and stiffening element 32 and in that the inner ends of the lips 33 of the moulding 34, which are adapted to be seated in the under-cut grooves 35, are return-bent so that they will not cut into the part 15. The moulding 34 is adapted to be assembled with the frame 12 in the same manner that the moulding 27 is adapted to be assembled with the frame 11. It will be noted that the element 32 serves to stiffen the dovetail rib 31 transversely and effectually insure against accidental separation of the moulding and the frame.

In the embodiment of the invention which is illustrated in Figure 4 of the drawing, there is provided in the outer face of the part 16 an under-cut groove 36. On the inner face of the moulding 37, which is preferably a die-cast or moulded member, there is provided an under-cut tongue 38 which is adapted to be seated in the groove 36 with the over-hanging lips of the groove seated in the under-cut recesses in the tongue. The moulding 37 is assembled with the frame 16 by properly superposing the two parts and pressing them together until the tongue 38 is seated in the groove 36, as shown in the drawing. During the course of this operation, the overhanging lips of the groove 36 are, of course, sprung outwardly, but since the part 16 is made of resilient material, they spring back into the under-cut grooves in the rib 38 when the tongue 38 reaches the position in which it is shown in the drawing and thus effectively interlock the frame and the moulding.

It will be obvious from a consideration of the construction of the frames and complementary mouldings illustrated in the drawing that none of the frames or mouldings are permanently distorted during the operations of assembling them, and that the frames and complementary mouldings may be disassembled and reassembled any reasonable number of times without destroying or substantially injuring either.

The mouldings 27, 34 and 37 may be given any desired finish which will harmonize with the general appearance of the vehicle or other structure on which they are to be installed and it will be obvious that these mouldings will considerably enhance the appearance of the portion of the window light frame which is exposed to view from the outside thereof, and, consequently, the appearance of the vehicle or other structure as a whole.

Although I have shown and described preferred embodiments of my invention, it is to be understood that this has been done by way of example and not by way of limitation and that the scope of my invention is to be determined only by the appended claims.

I claim:

1. An interlock structure which includes a resilient element in which there is provided a groove having oppositely disposed over-hanging lips, and a rigid element having a tongue in which there are provided oppositely disposed recesses seated in the groove with each of the lips seated in one of the recesses in the tongue.

2. In a window light structure, a frame of flexible rubber adapted to embrace the edges of a transparency, a groove having oppositely disposed overhanging lips in a face of the frame, and an ornamental moulding having a tongue in which there are provided oppositely disposed recesses seated in the groove with each of the lips of the groove seated in one of the recesses in the tongue.

FARRINGTON R. HALL.